United States Patent
Sapletal et al.

(10) Patent No.: US 7,009,551 B1
(45) Date of Patent: Mar. 7, 2006

(54) HORIZONTALLY POLARIZED WIDE-ANGLE RADAR OBJECT DETECTION

(75) Inventors: Greg J. Sapletal, Plainwell, MI (US);
Shawn Shi, Thousand Oaks, CA (US);
Kirk E. McClure, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/974,346

(22) Filed: Oct. 27, 2004

(51) Int. Cl.
*G01S 13/93* (2006.01)

(52) U.S. Cl. ......................................................... 342/70
(58) Field of Classification Search .................. 342/70, 342/71, 72; 343/700 MS, 911 L
See application file for complete search history.

(56) References Cited

U.S. PATENT DOCUMENTS

| | | | |
|---|---|---|---|
| 6,664,932 B1 * | 12/2003 | Sabet et al. | 343/700 MS |
| 2005/0068251 A1 * | 3/2005 | Ebling et al. | 343/911 L |

* cited by examiner

*Primary Examiner*—Daniel Pihulic
(74) *Attorney, Agent, or Firm*—Stefan V. Chmielewski

(57) ABSTRACT

A radar includes fixed beam radar transmitter and receiver antennae that utilize mixed polarization to optimize the object detection field-of-view through an intervening plastic fascia. The transmitter antenna transmits radar energy with slant polarization, a first receiver antenna designed for short-range wide-angle object detection passes only horizontally polarized radar energy, and a second receiver antenna designed for long-range narrow-angle object detection passes only vertically polarized radar energy.

8 Claims, 4 Drawing Sheets

20a

20b

20c

HORIZONTALLY POLARIZED WIDE-ANGLE RADAR OBJECT DETECTION

The present invention is directed to radar object detection, and more particularly to a horizontally polarized radar for achieving a wide-angle field of view through a plastic fascia.

TECHNICAL FIELD

Short-range obstacle detection for vehicle back-up and parking aid functions can be achieved with a wide-angle radar system, but cost and packaging considerations force design constraints that tend to limit the system performance. For example, overall vehicle cost considerations may effectively rule out the use of multiple transceivers for meeting wide zone-of-coverage requirements, and radar system packaging and cost considerations may effectively require the use of planar transmit and receive antennas, which in general are not well-suited to wide zone-of-coverage applications. Additionally, vehicle styling and design considerations frequently require the radar system to be concealed behind a plastic fascia panel, such as a bumper fascia, that variably attenuates radar energy transmission, especially at large angles with respect to the longitudinal axis of the vehicle.

A common approach for achieving the required zone-of-coverage in vehicle applications is to narrow the antenna radiation pattern and to radiate the specified zone-of-coverage by scanning. Another approach is to utilize custom-fabricated horns or non-planar antenna elements to broaden the radar field-of-view. However, such approaches are usually ruled out by cost and packaging considerations. Accordingly, what is needed is a low cost radar capable of placement behind a plastic fascia without sacrificing wide-angle field of view.

SUMMARY OF THE INVENTION

The present invention is directed to an improved radar including fixed beam transmitter and receiver antennae that utilize horizontal polarization for improved wide-angle field-of-view through a plastic fascia. In a preferred embodiment, the transmitter antenna transmits radar energy with slant polarization, a first receiver antenna designed for short-range wide-angle object detection includes a horizontal polarization feature, and a second receiver antenna designed for long-range narrow-angle object detection includes a vertical polarization feature.

BRIEF DESCRIPTION OF THE DRAWINGS

The present invention will now be described, by way of example, with reference to the accompanying drawings, in which:—

DESCRIPTION OF THE PREFERRED EMBODIMENT

The radar system of the present invention applies in general to the use of a fixed beam radar in applications requiring a wide-angle zone-of-coverage, where the sensor will be concealed behind a plastic/dielectric panel or fascia. The invention is illustrated herein in the context of a vehicle back-up and parking aid mounted on a vehicle bumper structure, but is applicable to other vehicle systems such as frontal or side object detection systems, and also to non-vehicle systems.

Figure 1:
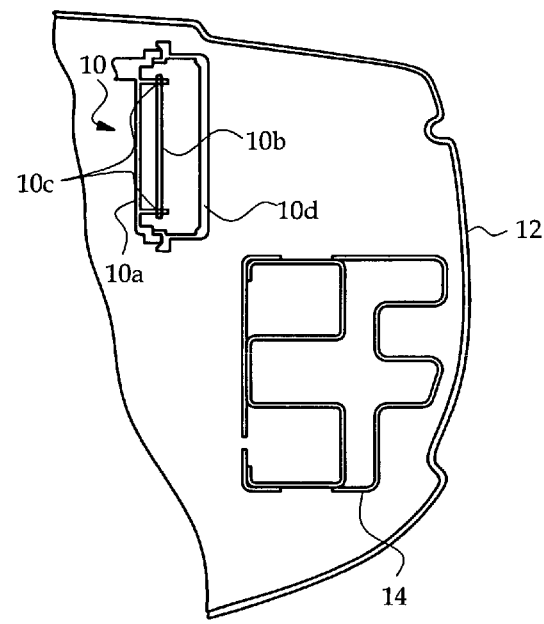
FIG. 1 is a cross-sectional side-view diagram of a vehicle bumper-mounted radar apparatus according to this invention.

FIG. 1 depicts a bumper-mounted back-up aid mechanization where a fixed beam radar sensor 10 is concealed behind a plastic fascia 12 surrounding the rear bumper frame 14. The radar sensor includes a base frame 10a mounted to a vehicle frame element (not shown), a multi-layer printed circuit board 10b supported on a set of base frame posts 10c, and a radome or cover 10d mounted on the base frame 10a to enclose and environmentally seal the circuit board 10b.

Figure 2:
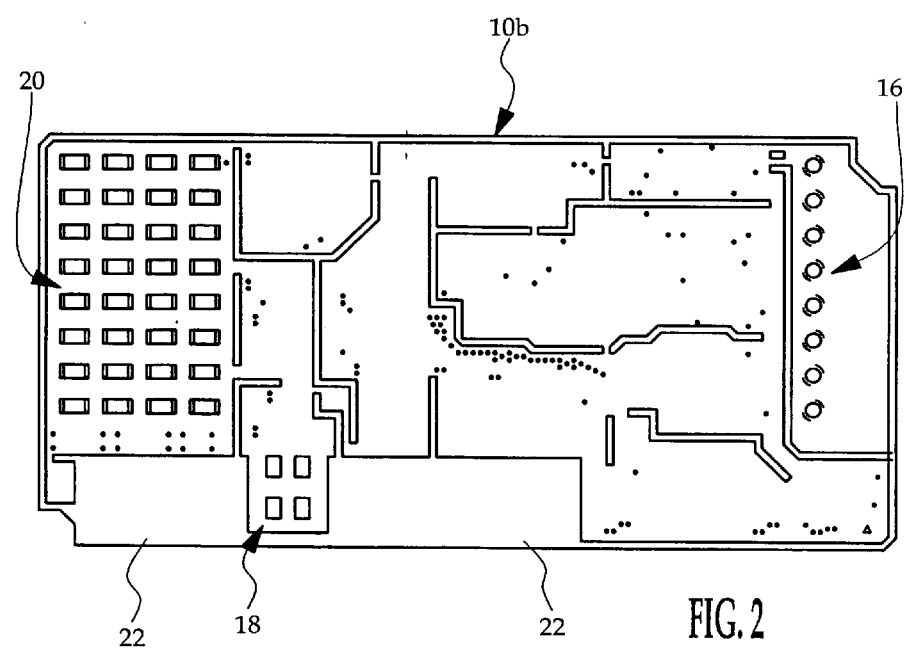
FIG. 2 depicts a multi-layer printed circuit board defining a planar transmitter antenna, a first planar receiver antenna for short-range wide-angle object detection, and a second planar receiver antenna for long-range narrow-angle object detection.

Referring to FIG. 2, the circuit board 10b is generally rectangular in shape, and defines three planar patch-type antennae. A transmitter antenna, generally designated by the reference numeral 16, is formed on the right-hand side of the circuit board 10b as viewed in FIG. 2, and first and second receiver antennae, generally designated by the reference numerals 18 and 20, are formed on the left-hand side of the circuit board 10b. The first receiver antenna 18 is designed for short-range wide-angle object detection, while the second receiver antenna 20 is designed for long-range narrow-angle object detection. A conductive ground plane, designated by the reference numerals 22 is disposed laterally or horizontally about the first receiver antenna 18 for enhanced wide-angle sensitivity.

In general, we have found that horizontally polarized radar frequency energy is subject to significantly less transmission attenuation when directed through a plastic/dielectric material than vertically polarized or un-polarized radar energy, particularly at small angles of incidence (i.e., at the extremities of the overall field of view). Vertical polarization is conventionally utilized for long-range narrow-angle fields of view in order to reduce background clutter and enhance detection of vertically oriented objects such as poles, but short-range wide-angle fields of view are not similarly constrained. Thus, using horizontal polarization for short-range wide-angle fields of view and retaining the use of vertical polarization for long-range narrow-angle fields of view significantly improves the overall performance of the radar system, so long as both vertically polarized and horizontally polarized reflected energy is returned to the radar sensor. In a preferred implementation, the first receive antenna 18 is horizontally polarized for enhanced short-range wide-angle object detection through a plastic fascia, the second receive antenna 20 is vertically polarized for reduced scatter and enhanced detection of vertically oriented objects, and the transmit antenna 16 is slant-polarized to create both vertical and horizontal reflected energy for the first and second receive antennae 18 and 20.

FIGS. 3A–3D, 4A–4D and 5A–5D depict the formation of the antennae 18, 20 and 16, respectively. Each antenna includes a set of three axially aligned features defined in three successive layers of the multi-layer circuit board 10b. In each case, the features include a feed network 18a, 20a, 16a, a set of polarization slots 18b, 20b, 16b, and a set of planar antenna patches 18c, 20c, 16c. The polarization slots 18b, 20b, 16b overlie the respective feed networks 18a, 20a, 16a, and the planar antenna patches 18c, 20c, 16c overlie the respective polarization slots 18b, 20b, 16b.

Figure 3A:
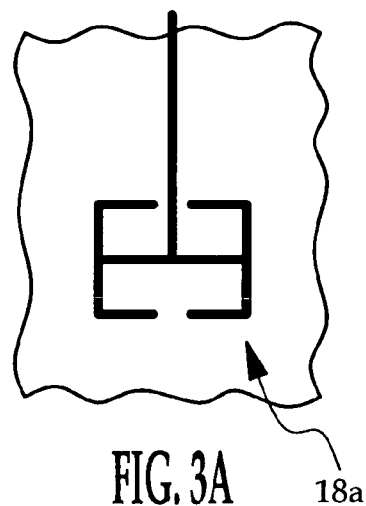
FIGS. 3A, 3B and 3C respectively depict first, second and third layers of the circuit board of FIG. 2 relative to the first receiver antenna.
Figure 3B:
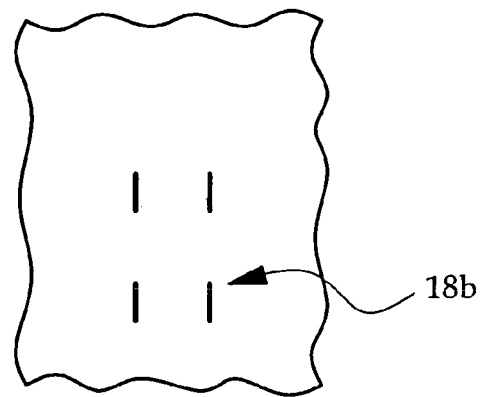
Figure 3C:
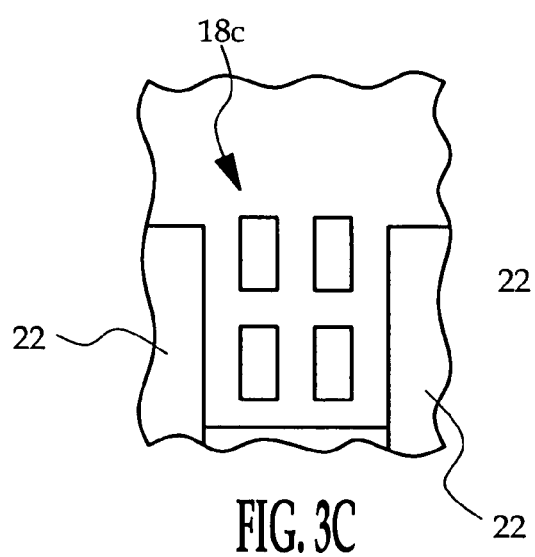
Figure 3D:
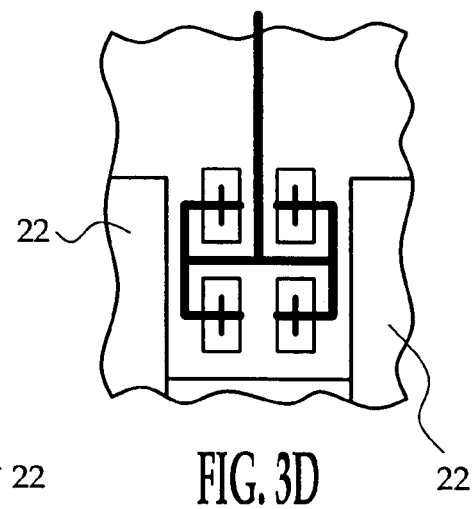
FIG. 3D depicts a composite of the first, second and third layers.

FIGS. 3A–3C respectively depict the feed network 18a, the polarization slots 18b, and the planar antenna patches 18c for the first receive antenna 18. The horizontally extending ground plane 22 is co-planar with the planar antenna patches 18c, and the polarization slots 18b pass horizontally polarized return signal to the feed network 18a. FIG. 3D is a composite view, depicting all three features of the antenna 18, and their axial alignment.

Figure 4A:
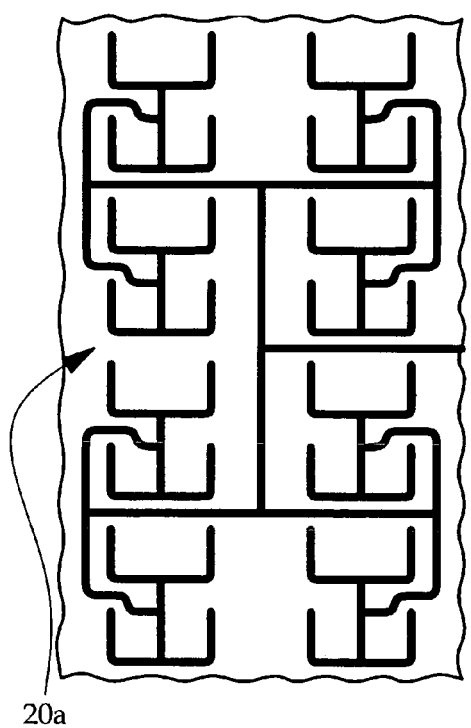
FIGS. 4A, 4B and 4C respectively depict first, second and third layers of the circuit board of FIG. 2 relative to the second receiver antenna.
Figure 4B:
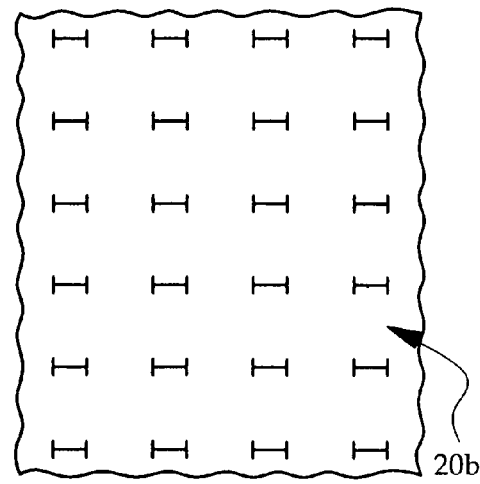
Figure 4C:
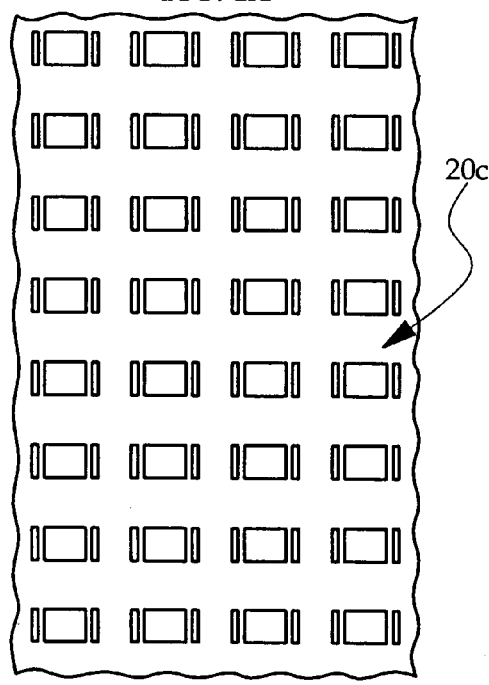
Figure 4D:
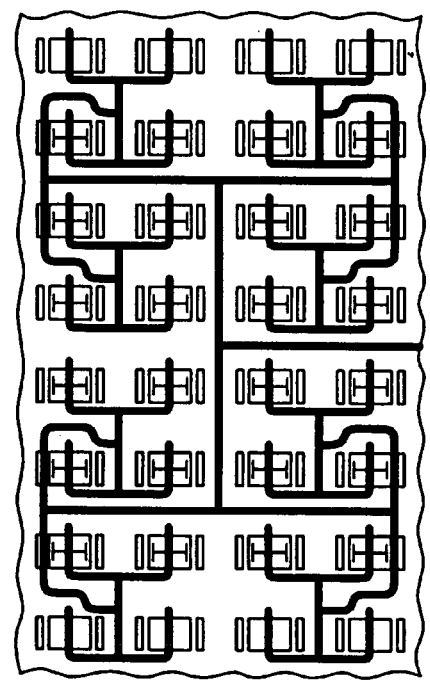
FIG. 4D depicts a composite of the first, second and third layers.

FIGS. 4A–4C respectively depict the feed network 20a, the polarization slots 20b, and the planar antenna patches 20c for the second receive antenna 20. In this case, the polarization slots 20b pass vertically polarized return signal to the feed network 20a. FIG. 4D is a composite view, depicting all three features of the antenna 20, and their axial alignment.

Figure 5A:
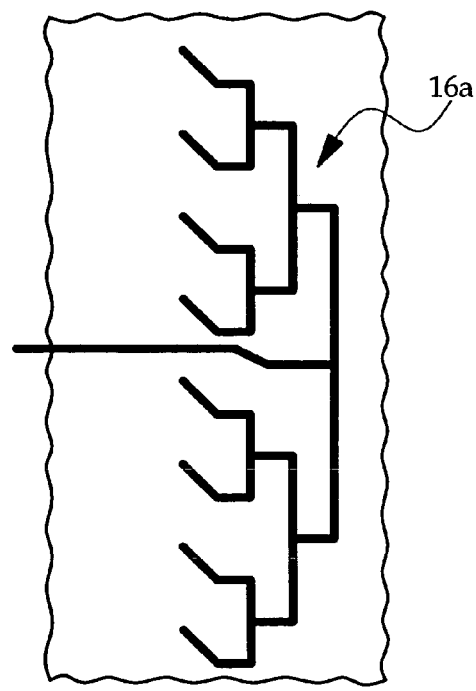
FIGS. 5A, 5B and 5C respectively depict first, second and third layers of the circuit board of FIG. 2 relative to the transmitter antenna.
Figure 5B:
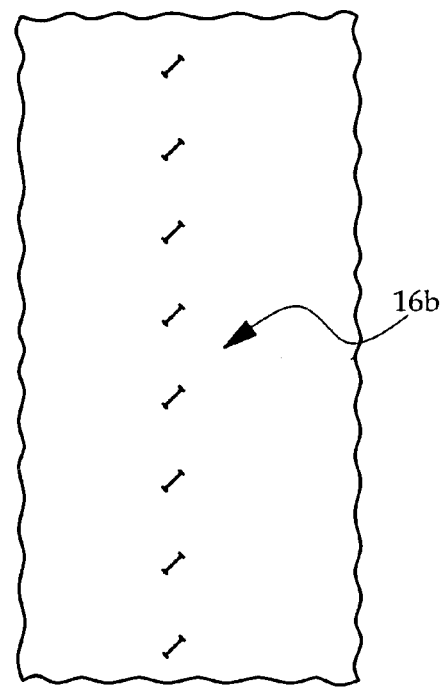
Figure 5C:
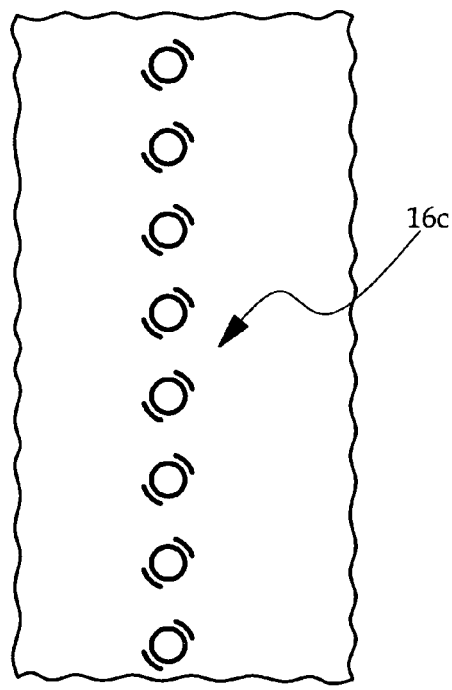
Figure 5D:
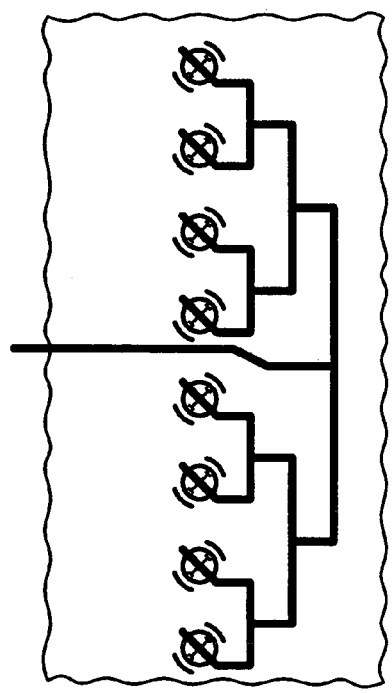
FIG. 5D depicts a composite of the first, second and third layers.

FIGS. 5A–5C respectively depict the feed network 16a, the polarization slots 16b, and the planar antenna patches 16c for the transmit antenna 16. The polarization slots 16b pass slant-polarized radar frequency energy, which in turn is radiated over a wide-angle field of view by the planar antenna patches 16c. The reflected radar energy includes both horizontally polarized and vertically polarized components, which are respectively received by the first and second receive antennae 18 and 20. FIG. 5D is a composite view, depicting all three features of the transmit antenna 16, and their axial alignment.

Summarizing, the present invention provides a simple and very cost effective way of utilizing horizontal polarization to achieve a high gain wide-angle radar field of view through a plastic fascia such as an automotive bumper covering. In applications where a long-range narrow-angle field of view is used in connection with the wide-angle field, the use of vertical polarization for reduced background clutter and enhanced vertical object detection can be retained by slant polarizing a single transmit antenna that produces both horizontally polarized and vertically polarized return energy for the wide-angle and narrow-angle receive antennae. In applications where a narrow-angle field of view is not required, the receive antenna 20 may be omitted, and the transmitter antenna 16 may be either horizontally polarized or slant polarized as shown.

While the invention has been described in reference to the illustrated embodiment, an automotive back-up and parking aid, it should be understood that the invention may be used in other applications as well. For example, the invention may be used other types of automotive applications such as forward-looking radars, collision avoidance systems and safety sensing, and also in non-automotive applications such as security systems. Also, it is expected that various modifications in addition to those mentioned above will occur to those skilled in the art. For example, the invention can be implemented with non-planar antennae, and so on. Accordingly, it is intended that the invention not be limited to the disclosed embodiment, but that it have the full scope permitted by the language of the following claims.

What is claimed is:

1. Radar apparatus for detecting objects through an intervening plastic fascia, comprising:
   a radar transmitter including a transmit antenna for directing radar energy through the fascia over a wide-angle field of view, said transmitter having a slant polarization feature that slant polarizes the directed radar energy; and
   a first receiver antenna including a horizontal polarization feature for admitting only horizontally polarized components of said radar energy reflected through said fascia from objects in said wide-angle field of view.

2. The radar apparatus of claim 1, wherein said first receiver antenna includes planar antenna patches and a ground plane conductor that extends horizontally in opposite directions from said antenna patches.

3. The radar apparatus of claim 1, wherein said transmit antenna and said first receiver antenna are formed on a single multi-layer printed circuit board.

4. The radar apparatus of claim 1, further comprising:
   a second receiver antenna including a vertical polarization feature for admitting only vertically polarized components of said radar energy reflected through said fascia from objects in said field of view.

5. The radar apparatus of claim 4, wherein said transmit antenna and said first and second receiver antennae are formed on a single multi-layer printed circuit board.

6. The radar apparatus of claim 1, wherein said intervening plastic fascia is a bumper covering fascia of a motor vehicle.

7. A method of utilizing radar for object detection through an intervening plastic fascia, comprising the steps of:
   transmitting slant polarized radar energy through the fascia over a wide-angle field of view; and
   receiving horizontally polarized components of said radar energy reflected through said fascia from objects in said wide-angle field of view.

8. The method of claim 7, including the step of:
   separately receiving horizontally polarized and vertically polarized components of said radar energy reflected through said fascia from objects in said wide-angle field of view.

\* \* \* \* \*